(12) United States Patent
Takabayashi

(10) Patent No.: US 11,769,936 B2
(45) Date of Patent: Sep. 26, 2023

(54) SECONDARY BATTERY AND METHOD FOR MANUFACTURING SAME

(71) Applicant: SANYO Electric Co., Ltd., Daito (JP)

(72) Inventor: Hiroshi Takabayashi, Hyogo (JP)

(73) Assignee: SANYO Electric Co., Ltd., Osaka (JP)

( * ) Notice: Subject to any disclaimer, the term of this patent is extended or adjusted under 35 U.S.C. 154(b) by 234 days.

(21) Appl. No.: 17/424,268

(22) PCT Filed: Dec. 24, 2019

(86) PCT No.: PCT/JP2019/050460
§ 371 (c)(1),
(2) Date: Jul. 20, 2021

(87) PCT Pub. No.: WO2020/158255
PCT Pub. Date: Aug. 6, 2020

(65) Prior Publication Data
US 2022/0094024 A1 Mar. 24, 2022

(30) Foreign Application Priority Data

Jan. 29, 2019 (JP) ................................ 2019-012633

(51) Int. Cl.
| | | |
|---|---|---|
| *H01M 4/00* | (2006.01) | |
| *H01M 50/536* | (2021.01) | |
| *H01M 4/66* | (2006.01) | |
| *H01M 50/533* | (2021.01) | |
| *H01M 50/534* | (2021.01) | |

(52) U.S. Cl.
CPC ......... *H01M 50/536* (2021.01); *H01M 4/662* (2013.01); *H01M 50/533* (2021.01); *H01M 50/534* (2021.01)

(58) Field of Classification Search
CPC ............................ H01M 50/536; H01M 4/66
See application file for complete search history.

(56) References Cited

U.S. PATENT DOCUMENTS

2012/0202105 A1  8/2012  Shinyashiki et al.
2014/0295233 A1  10/2014  Daidoji

FOREIGN PATENT DOCUMENTS

| CN | 106165160 A | * 11/2016 | ........ H01M 10/0525 |
|---|---|---|---|
| JP | 2003-272598 A | 9/2003 | |
| JP | 2012-125801 A | 7/2012 | |

(Continued)

OTHER PUBLICATIONS

Matsuno et al, Nonaqueous Electrolyte Secondary Battery, See the Abstract. (Year: 2016).*

(Continued)

*Primary Examiner* — Cynthia H Kelly
*Assistant Examiner* — Monique M Wills
(74) *Attorney, Agent, or Firm* — WHDA, LLP

(57) ABSTRACT

A method of manufacturing a secondary battery including a joining step of clamping a negative electrode core body stacked part and a negative electrode current collector by a horn and an anvil, and in a state where the anvil is in contact with the negative electrode current collector, ultrasonically joining the negative electrode core body stacked part and the negative electrode current collector to form a joint part; and an oxidation treatment step of oxidizing a portion, in contact with the anvil, of the negative electrode current collector in the joining step.

8 Claims, 10 Drawing Sheets

(56) References Cited

FOREIGN PATENT DOCUMENTS

| JP | 2012-164470 A | 8/2012 |
| WO | 2013/031937 A1 | 3/2013 |

OTHER PUBLICATIONS

International Search Report dated Mar. 17, 2020, issued in counterpart International Application No. PCT/JP2019/050460. (2 pages).

* cited by examiner (a)                       (b)

US 11,769,936 B2

SECONDARY BATTERY AND METHOD FOR MANUFACTURING SAME

TECHNICAL FIELD

The present disclosure relates to a secondary battery and a method of manufacturing the secondary battery.

BACKGROUND ART

A secondary battery, such as a lithium-ion secondary battery, has a structure in which an electrode body including a positive plate and a negative plate is housed in a battery case along with an electrolyte. The positive plate and the negative plate included in the electrode body are each such that an active material layer is formed on the surface of a core body made of metal. A core body exposed part provided in each of the positive plate and the negative plate is electrically connected to a terminal attached to the battery case via a current collector.

As a method of joining a core body and a current collector, a joining method by ultrasonic joining is known. The ultrasonic joining is performed by applying vibrational energy from ultrasonic waves to a joint surface while clamping the stacked core body and current collector by a horn and an anvil. Note that in order to clamp the stacked core body and current collector reliably, the surfaces of the horn and the anvil are each provided with multiple projections.

For example, PTL 1 discloses a method in which the shape of the projections provided on the surface of the horn is made circular, and the periphery of the horn is provided with a margin area where projections are not formed.

CITATION LIST

Patent Literature

PTL 1: Japanese Published Unexamined Patent Application No. 2012-125801

SUMMARY OF INVENTION

Technical Problem

It is an object of the present disclosure to provide a secondary battery with reduced short circuit between the positive plate and the negative plate.

Solution to Problem

A method of manufacturing a secondary battery according to an aspect of the present disclosure is provided, the secondary battery including:
a first electrode plate,
a second electrode plate having a polarity different from a polarity of the first electrode plate,
an electrode body including the first electrode plate and the second electrode plate, and
a first electrode current collector which is made of copper or copper alloy, and electrically connected to the first electrode plate,
wherein the first electrode plate has a first electrode core body made of copper or copper alloy, and a first electrode active material layer formed on the first electrode core body,
the electrode body has a first electrode core body stacked part in which the first electrode core body is stacked, and the first electrode core body stacked part is joined to the first electrode current collector.

The method includes:
a joining step of clamping the first electrode core body stacked part and the first electrode current collector by a horn and an anvil, and in a state where the anvil is in contact with the first electrode current collector, ultrasonically joining the first electrode core body stacked part and the first electrode current collector to form a joint part; and
an oxidation treatment step of oxidizing a portion, in contact with the anvil, of the first electrode current collector in the joining step.

The inventors of the present application examined small metal pieces (dust generation) generated in a joint part after multiple stacked core bodies and current collectors are joined by ultrasonic joining, and found that a small metal piece was included, which is larger than the film thickness of a core body. It was found from subsequent detailed analysis that a small metal piece in such a size was not generated by being peeled off from a core body, but was generated by being scraped from a current collector.

When a current collector is made of copper or copper alloy, a small metal piece scraped from the current collector at the time of ultrasonic joining is a small metal piece (copper piece, copper alloy piece) composed of copper or copper alloy. For example, when an electrolyte is injected into a battery case, a small metal piece composed of copper or copper alloy may be moved onto the positive plate. When a small metal piece composed of copper or copper alloy is present on the positive plate, the small metal piece composed of copper or copper alloy on the positive plate is dissolved in the electrolyte by charging and discharging of the secondary battery, and dendrite may be grown on the negative plate. As a consequence, the dendrite may break through a separator, and an internal short circuit between the positive plate and the negative plate may occur.

By the method of manufacturing a secondary battery according to an aspect of the present disclosure, a small metal piece composed of copper or copper alloy and a burr which may turn into a small metal piece composed of copper or copper alloy can be oxidized by performing oxidation treatment on a portion of a current collector, which comes into contact with an anvil at the time of ultrasonic joining. Even when the oxidized small metal piece composed of copper or copper alloy is present on the positive plate, the small metal piece is not dissolved in the electrolyte by charging of the secondary battery. Therefore, the occurrence of dendrite composed of copper or copper alloy on the negative plate can be reduced. Thus, it is possible to provide a secondary battery with reduced short circuit between the positive plate and the negative plate.

Note that the first electrode plate may be a positive plate or may be a negative plate.

A secondary battery according to an aspect of the present disclosure includes:
a first electrode plate;
a second electrode plate having a polarity different from a polarity of the first electrode plate;
an electrode body including the first electrode plate and the second electrode plate; and
a first electrode current collector which is made of copper or copper alloy, and electrically connected to the first electrode plate.

The first electrode plate has a first electrode core body made of copper or copper alloy, and a first electrode active material layer formed on the first electrode core body, the electrode body has a first electrode core body stacked part in which the first electrode core body is stacked, and the first electrode core body stacked part is joined to the first electrode current collector.

An irregularities formed part is formed on a surface of the first electrode current collector on an opposite side of a surface joined to the first electrode core body stacked part, a layer composed of a copper compound containing divalent copper is formed on a surface of the irregularities formed part, and a thickness of the layer composed of the copper compound containing divalent copper is greater than a thickness of an oxidized film formed on a surface of a portion of the first electrode current collector, the portion being at a position away from the irregularities formed part.

With the configuration of the secondary battery according to an aspect of the present disclosure, it is possible to provide the secondary battery with reduced short circuit between the positive plate and the negative plate.

Advantageous Effects of Invention

According to the present disclosure, the secondary battery with reduced short circuit between the positive plate and the negative plate can be provided.

Figure 3:
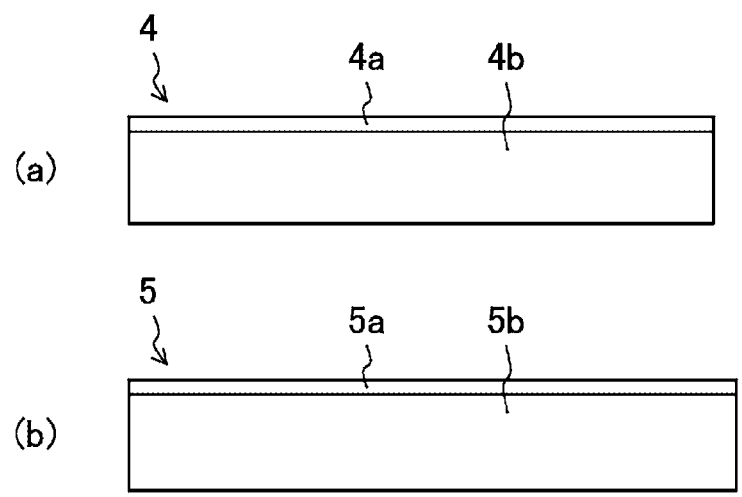

(a) of FIG. 3 is a plan view of a positive plate according to the embodiment, and (b) of FIG. 3 is a plan view of a negative plate according to the embodiment.

Figure 4:
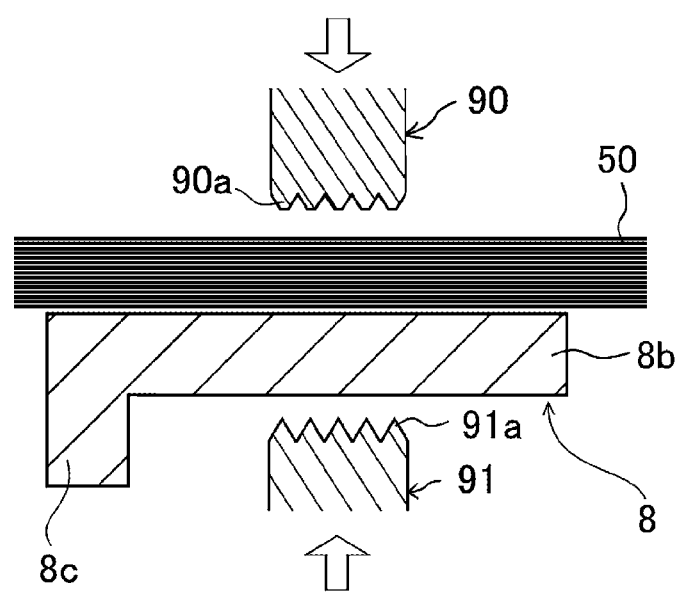

FIG. 4 is a cross-sectional view of a negative electrode current collector and a negative electrode core body stacked part according to the embodiment, and the view shows a state before the negative electrode current collector and the negative electrode core body stacked part are clamped by a horn and an anvil.

Figure 5:
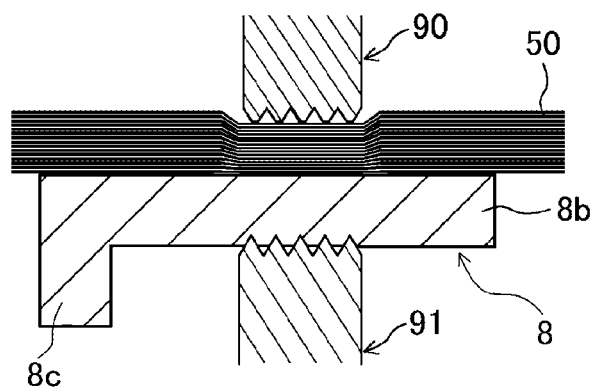

FIG. 5 is a cross-sectional view of the negative electrode current collector and the negative electrode core body stacked part according to the embodiment, and the view shows a state after the negative electrode current collector and the negative electrode core body stacked part are clamped by a horn and an anvil.

Figure 6:
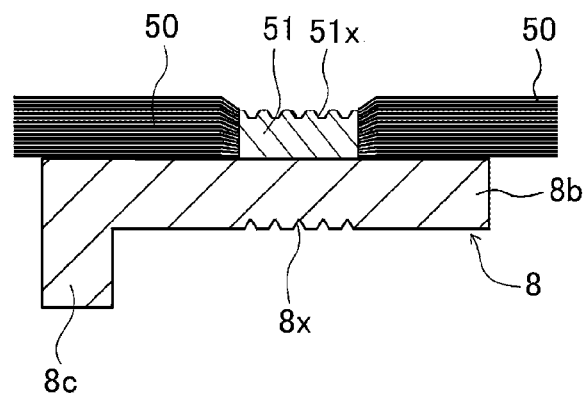

FIG. 6 is a cross-sectional view of the negative electrode current collector and the negative electrode core body stacked part according to the embodiment, and the view shows a state after the negative electrode current collector and the negative electrode core body stacked part are ultrasonically joined.

Figure 7:
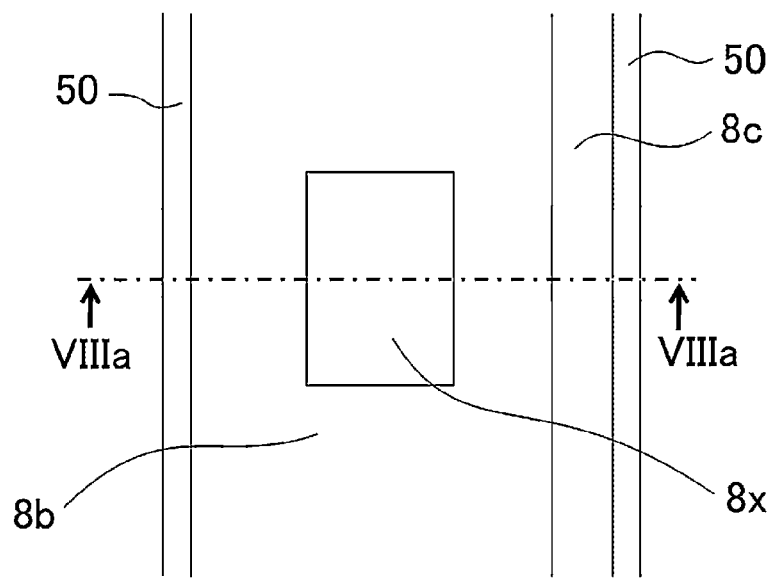

FIG. 7 is a plan view of the negative electrode current collector and the negative electrode core body stacked part after being ultrasonically joined according to the embodiment.

Figure 8:
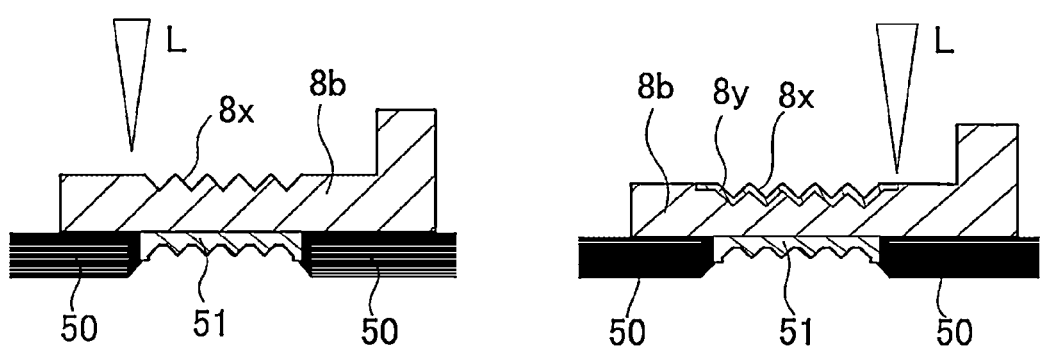

(a) and (b) of FIG. 8 show the manner in which an irregularities formed part of the negative electrode current collector is irradiated with a laser, and oxidation treatment is performed on the surface of the irregularities formed part.

Figure 9:
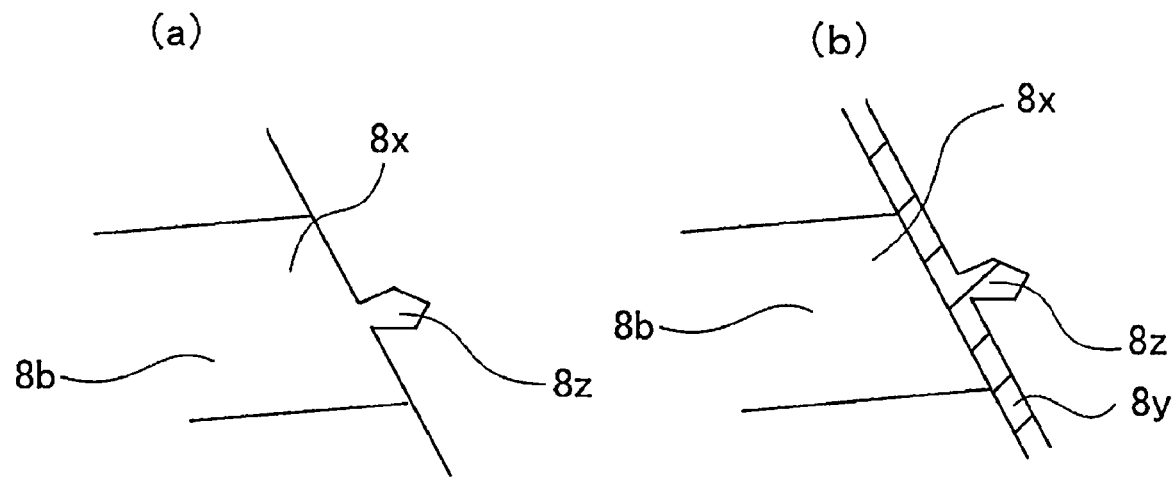

FIG. 9 is an enlarged cross-sectional view of the irregularities formed part. (a) of FIG. 9 is a view before the oxidation treatment, and (b) of FIG. 9 is a view after the oxidation treatment.

Figure 10:
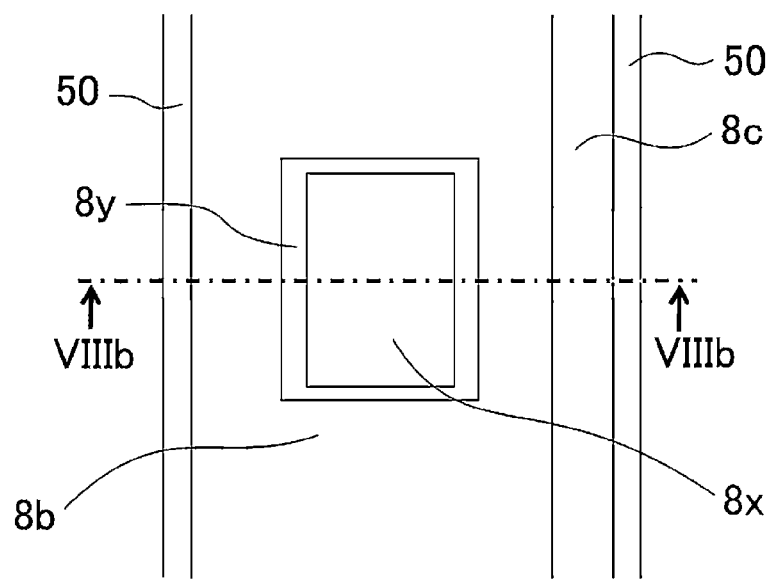

FIG. 10 is a plan view of the negative electrode current collector after the oxidation treatment.

Figure 11:
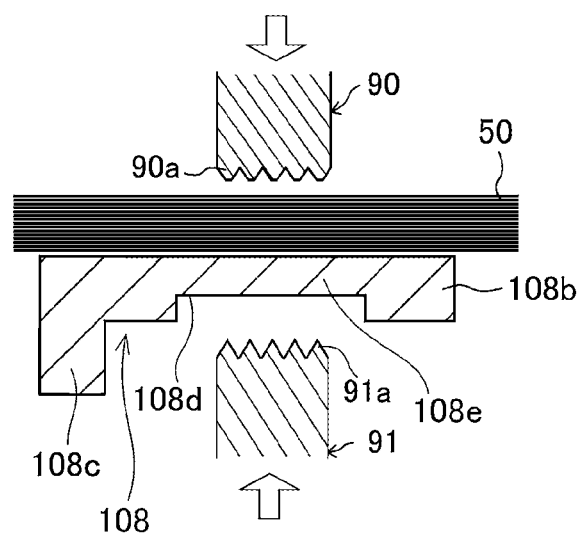

FIG. 11 is a cross-sectional view of a negative electrode current collector and a negative electrode core body stacked part according to Modification 1, and the view shows a state before the negative electrode current collector and the negative electrode core body stacked part are clamped by a horn and an anvil.

Figure 12:
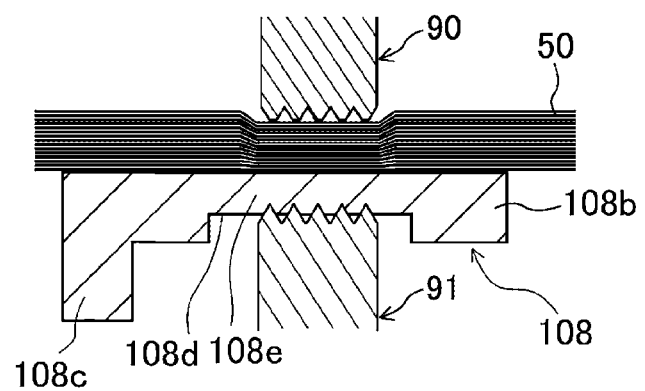

FIG. 12 is a cross-sectional view of the negative electrode current collector and the negative electrode core body stacked part according to Modification 1, and the view shows a state after the negative electrode current collector and the negative electrode core body stacked part are clamped by the horn and the anvil.

Figure 13:
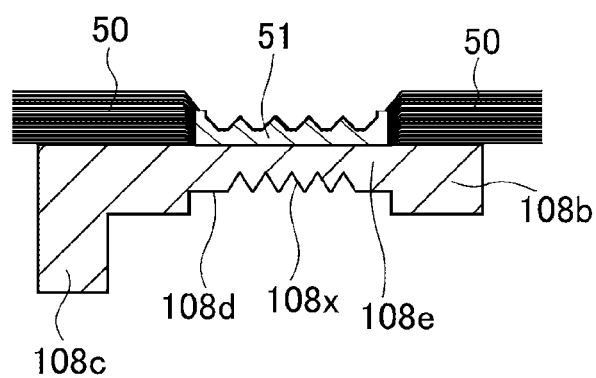

FIG. 13 is a cross-sectional view of the negative electrode current collector and the negative electrode core body stacked part according to Modification 1, and the view shows a state after the negative electrode current collector and the negative electrode core body stacked part are ultrasonically joined.

Figure 14:
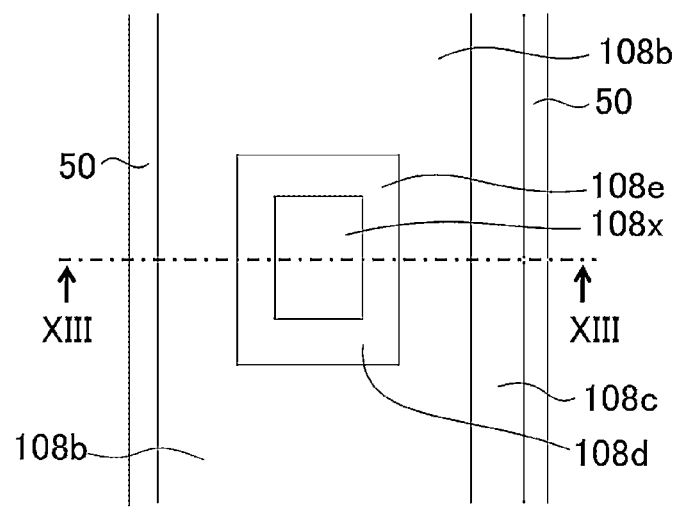

FIG. 14 is a plan view of the negative electrode current collector and the negative electrode core body stacked part before oxidation treatment according to Modification 1.

Figure 15:
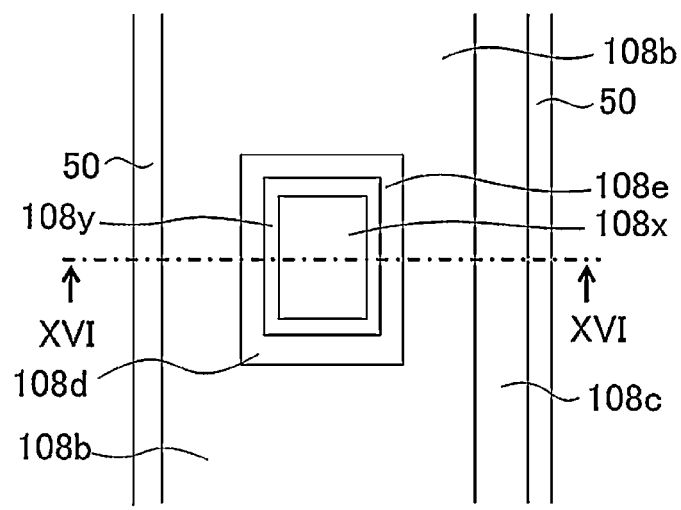

FIG. 15 is a plan view of the negative electrode current collector and the negative electrode core body stacked part after the oxidation treatment according to Modification 1.

Figure 16:
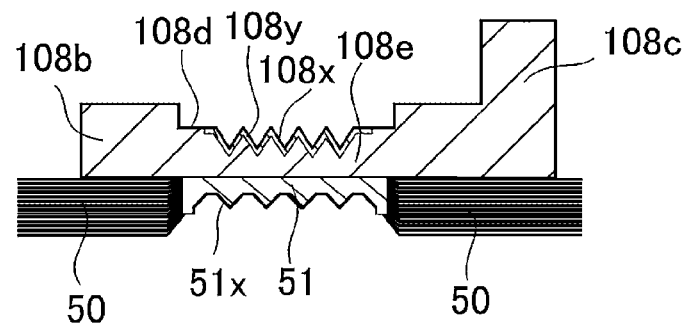

FIG. 16 is a cross-sectional view taken along XVI-XVI in FIG. 15.

DESCRIPTION OF EMBODIMENTS

Hereinafter, a rectangular secondary battery 100 as a secondary battery according to an embodiment of the present disclosure will be described with reference to the drawings. Note that the scope of the present disclosure is not limited to the following embodiment, and is modifiable in any way within the scope of technical idea of the present disclosure.

Figure 1:
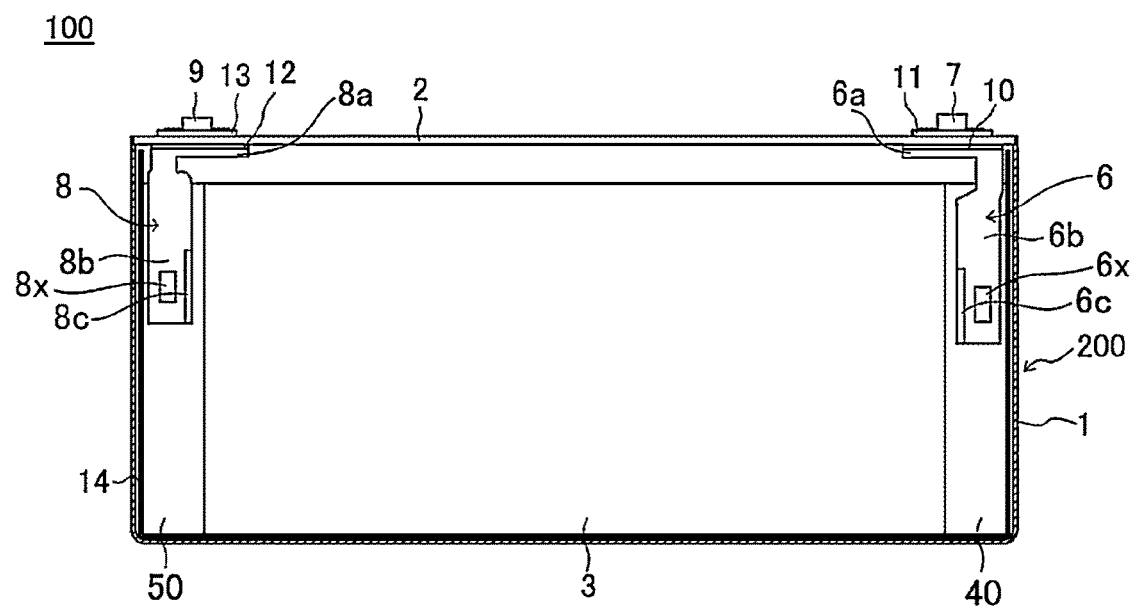
FIG. 1 is a schematic front view showing the inside of a rectangular secondary battery according to an embodiment with the front portion of a rectangular exterior body and the front portion of an insulating sheet of the battery removed.
Figure 2:
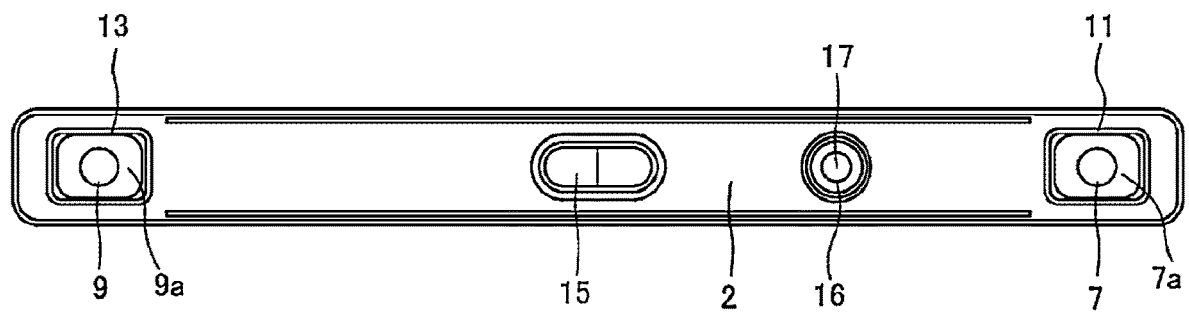
FIG. 2 is a top view of the rectangular secondary battery according to the embodiment.

First, the configuration of the rectangular secondary battery 100 according to one embodiment will be described. As shown in FIG. 1 and FIG. 2, the rectangular secondary battery 100 includes a rectangular exterior body 1 having an opening above, and a sealing plate 2 that seals the opening. A battery case 200 is formed by the rectangular exterior body 1 and the sealing plate 2. The rectangular exterior body 1 and the sealing plate 2 are each made of metal, and preferably made of aluminum or aluminum alloy, for example. In the rectangular exterior body 1, a flat-shaped winding-type electrode body 3, in which a belt-shaped positive plate and a belt-shaped negative plate are wound with a belt-shaped separator interposed therebetween, is housed along with non-aqueous electrolyte (illustration is omitted). A plastic insulating sheet 14 is disposed between the rectangular exterior body 1 and the electrode body 3. The sealing plate 2 is provided with a gas exhaust valve 15 that, upon the pressure in the battery case 200 reaching a predetermined value or higher, breaks to allow the gas in the battery case 200 to exhaust to the outside of the battery case 200. In addition, an electrolyte injection hole 16 provided in the sealing plate 2 is sealed by a sealing member 17.

As shown in (a) of FIG. 3, the positive plate 4 has a positive electrode core body 4a made of metal, and a positive electrode active material layer 4b formed on both sides of the positive electrode core body 4a. The positive plate 4 has, at an end thereof in a widthwise direction, a positive electrode core body exposed part in a longitudinal direction, where the positive electrode active material layer 4b is not formed on both sides of the positive electrode core body 4a. The positive electrode core body 4a is preferably made of aluminum or aluminum alloy. The positive electrode active material layer 4b contains a positive electrode active material. For example, lithium transition metal composite oxide or the like can be used as the positive electrode active material. In addition, the positive electrode active material layer 4b preferably contains a binder and a conductive material. A binder made of plastic is preferable as the binder, and polyvinylidene fluoride can be used, for example. A carbon material, such as carbon black, is preferable as the conductive member.

As shown in (b) of FIG. 3, a negative plate 5 has a negative electrode core body 5a made of metal, and a negative electrode active material layer 5b formed on both sides of the negative electrode core body 5a. The negative plate 5 has, at an end thereof in a widthwise direction, a negative electrode core body exposed part in a longitudinal direction, where the negative electrode active material layer 5b is not formed on both sides of the negative electrode core body 5a. The negative electrode core body 5a is preferably made of copper or copper alloy. The negative electrode active material layer 5b contains a negative electrode active material. For example, a carbon material such as black lead and amorphous carbon, and a silicon material such as silicon and oxide silicon can be used as the negative electrode active material. The negative electrode active material layer 5b preferably contains a binder. A binder made of plastic is preferable as the binder, and the binder preferably contains, for example, styrene-butadiene rubber (SBR) and carboxymethyl cellulose (CMC). The negative electrode active material layer 5b may contain a conductive material as necessary.

The winding-type electrode body 3 has a positive electrode core body exposed part wound at one end, and a negative electrode core body exposed part wound at the other end. The wound positive electrode core body exposed part constitutes a positive electrode core body stacked part 40 in which the positive electrode core body 4a is stacked. The wound negative electrode core body exposed part constitutes a negative electrode core body stacked part 50 in which the negative electrode core body 5a is stacked.

The positive electrode core body stacked part 40 is connected to a positive electrode current collector 6. The positive electrode current collector 6 is connected to a positive electrode terminal 7 attached to the sealing plate 2. An inner-side insulating member 10 made of plastic is disposed between the sealing plate 2 and the positive electrode current collector 6. An outer-side insulating member 11 made of plastic is disposed between the sealing plate 2 and the positive electrode terminal 7. The positive electrode current collector 6 and the positive electrode terminal 7 are electrically insulated from the sealing plate 2 by the inner-side insulating member 10 and the outer-side insulating member 11. The positive electrode current collector 6 and the positive electrode terminal 7 are made of metal, and preferably made of aluminum or aluminum alloy, for example.

The negative electrode core body stacked part 50 is connected to a negative electrode current collector 8. The negative electrode current collector 8 is connected to a negative electrode terminal 9 attached to the sealing plate 2. An inner-side insulating member 12 made of plastic is disposed between the sealing plate 2 and the negative electrode current collector 8. An outer-side insulating member 13 made of plastic is disposed between the sealing plate 2 and the negative electrode terminal 9. The negative electrode current collector 8 and the negative electrode terminal 9 are electrically insulated from the sealing plate 2 by the inner-side insulating member 12 and the outer-side insulating member 13. The negative electrode current collector 8 and the negative electrode terminal 9 are made of metal, and preferably made of copper or copper alloy, for example. In addition, the negative electrode terminal 9 preferably has a portion composed of copper or copper alloy, and a portion composed of aluminum or aluminum alloy. It is preferable that the portion composed of copper or copper alloy be connected to the negative electrode current collector 8 composed of copper or copper alloy, and the portion composed of aluminum or aluminum alloy be exposed to the outer side of the sealing plate 2.

The positive electrode terminal 7 has a flange portion 7a disposed on the outer side of the battery with respect to the sealing plate 2, and an insertion portion (illustration is omitted) formed on one of the surfaces of the flange portion 7a. The insertion portion penetrates a positive electrode terminal mounting hole (illustration is omitted) provided in the sealing plate 2, and is connected to the positive electrode current collector 6.

The negative electrode terminal 9 has a flange part 9a disposed on the outer side of the battery with respect to the sealing plate 2, and an insertion portion (illustration is omitted) formed on one of the surfaces of the flange part 9a. The insertion portion penetrates a negative electrode terminal mounting hole (illustration is omitted) provided in the sealing plate 2, and is connected to the negative electrode current collector 8.

Note that the positive electrode current collector 6 and the positive electrode terminal 7 may be electrically connected via another conductive member. Also, the negative electrode current collector 8 and the negative electrode terminal 9 may be electrically connected via another conductive member.

The positive electrode current collector 6 has a base part 6a disposed between the sealing plate 2 and the electrode body 3, and a lead part 6b which extends from one end of the base part 6a to the side of the electrode body 3. The positive electrode terminal 7 is connected to the base part 6a. The lead part 6b is joined to the positive electrode core body stacked part 40. The end of the lead part 6b in a widthwise direction is provided with a rib 6c. Note that the rib 6c may be omitted.

The negative electrode current collector 8 has a base part 8a disposed between the sealing plate 2 and the electrode body 3, and a lead part 8b which extends from one end of the base part 8a to the side of the electrode body 3. The negative electrode terminal 9 is connected to the base part 8a. The lead part 8b is joined to the negative electrode core body stacked part 50. The end of the lead part 8b in a widthwise direction is provided with a rib 8c. Note that the rib 8c may be omitted.

In the lead part 6b of the positive electrode current collector 6, an irregularities formed part 6x is formed on the surface on the opposite side of the surface joined to the positive electrode core body stacked part 40 in the portion joined to the positive electrode core body stacked part 40. The irregularities formed part 6x is formed by anvil projections provided in the anvil biting into the positive electrode current collector 6 when the positive electrode current collector 6 and the positive electrode core body stacked part 40 are ultrasonically joined. In short, the irregularities formed part 6x is a mark pressed by the anvil.

In the lead part 8b of the negative electrode current collector 8, an irregularities formed part 8x is formed on the surface on the opposite side of the surface joined to the negative electrode core body stacked part 50 in the portion joined to the negative electrode core body stacked part 50. The irregularities formed part 8x is formed by anvil projections provided in the anvil biting into the negative electrode current collector 8 when the negative electrode current collector 8 and the negative electrode core body stacked part 50 are ultrasonically joined. In short, the irregularities formed part 8x is a mark pressed by the anvil.

[Mounting Each Component on Sealing Plate]

Hereinafter, a method of mounting the positive electrode current collector 6, the positive electrode terminal 7, the negative electrode current collector 8 and the negative electrode terminal 9 to the sealing plate 2 will be described.

First, in the periphery of a positive electrode terminal mounting hole (illustration is omitted) provided in the sealing plate 2, the outer-side insulating member 11 is disposed on the outer side of the battery with respect to the sealing plate 2, and the inner-side insulating member 10 and the base part 6a of the positive electrode current collector 6 are disposed on the inner side of the sealing plate 2. Next, the insertion portion of the positive electrode terminal 7 is inserted from the outer side of the battery into a through-hole of the outer-side insulating member 11, the positive electrode terminal mounting hole of the sealing plate 2, a through-hole of the inner-side insulating member 10 and a through-hole of the base part 6a, and the tip end side of the insertion portion of the positive electrode terminal 7 is swaged onto the base part 6a. Consequently, the positive electrode terminal 7, the outer-side insulating member 11, the sealing plate 2, the inner-side insulating member 10 and the positive electrode current collector 6 are integrally fixed. Note that a swaged portion at the tip end of the insertion portion of the positive electrode terminal 7 may be welded to the base part 6a.

Similarly, in the periphery of a negative electrode terminal mounting hole (illustration is omitted) provided in the sealing plate 2, the outer-side insulating member 13 is disposed on the outer side of the battery with respect to the sealing plate 2, and the inner-side insulating member 12 and the base part 8a of the negative electrode current collector 8 are disposed on the inner side of the battery with respect to the sealing plate 2. Next, the insertion portion of the negative electrode terminal 9 is inserted from the outer side of the battery into a through-hole of the outer-side insulating member 13, the negative electrode terminal mounting hole of the sealing plate 2, a through-hole of the inner-side insulating member 12 and a through-hole of the base part 8a, and the tip end side of the insertion portion of the negative electrode terminal 9 is swaged onto the base part 8a. Consequently, the negative electrode terminal 9, the outer-side insulating member 13, the sealing plate 2, the inner-side insulating member 12 and the negative electrode current collector 8 are integrally fixed. Note that a swaged portion at the tip end of the insertion portion of the negative electrode terminal 9 may be welded to the base part 8a.

[Assembly of Rectangular Secondary Battery 100]

The positive electrode current collector 6 mounted on the sealing plate 2 and the positive electrode core body stacked part 40 are joined, and the negative electrode current collector 8 mounted on the sealing plate 2 and the negative electrode core body stacked part 50 are joined. The electrode body 3 is then covered by the insulating sheet 14, and the electrode body 3 covered by the insulating sheet 14 is inserted into the rectangular exterior body 1. The sealing plate 2 is then welded to the rectangular exterior body 1 by laser welding, and the opening of the rectangular exterior body 1 is sealed by the sealing plate 2. After non-aqueous electrolyte is injected from the electrolyte injection hole 16 of the sealing plate 2 into the battery case 200, the electrolyte injection hole 16 is sealed by the sealing member 17. Thus, the rectangular secondary battery 100 is formed.

Hereinafter, a method of joining a current collector and a core body stacked part will be described using an example of a method of joining the negative electrode current collector 8 and the negative electrode core body stacked part 50. Note that joining the positive electrode current collector 6 and the positive electrode core body stacked part 40 can be performed by a similar method.

[Joining of Current Collector and Core Body Stacked Part]

As shown in FIG. 4, the negative electrode core body stacked part 50 is disposed on one of the surfaces of the lead part 8b of the negative electrode current collector 8. The negative electrode core body stacked part 50 and the lead part 8b are clamped by a horn 90 and an anvil 91. The horn 90 has multiple horn projections 90a on its tip end. The horn projections 90a are then brought into contact with the negative electrode core body stacked part 50. The anvil 91 has multiple anvil projections 91a on its tip end. The anvil projections 91a are then brought into contact with the lead part 8b.

As shown in FIG. 5, the negative electrode core body stacked part 50 and the lead part 8b are clamped by the horn 90 and the anvil 91, thus a state is achieved in which the horn projections 90a are biting into the negative electrode core body stacked part 50, and the anvil projections 91a are biting into the lead part 8b. As shown in FIG. 6, application of ultrasonic vibration to the horn 90 allows the negative electrode core bodies 5a in the negative electrode core body stacked part 50 as well as the negative electrode core body stacked part 50 and the lead part 8b to be joined. Consequently, a joint part 51 is formed in the negative electrode core body stacked part 50.

A core body-side irregularities formed part 51x is formed on the surface of the joint part 51. In addition, the irregularities formed part 8x, which is a mark pressed by the anvil 91, is formed on the lead part 8b.

FIG. 7 is a plan view of the surface of the lead part 8b on the opposite side of the surface joined to the negative electrode core body stacked part 50 after the negative electrode core body stacked part 50 and the lead part 8b are ultrasonically joined. On the lead part 8b, the irregularities formed part 8x, which is a mark pressed by the anvil 91, is formed on the opposite side of the portion where the joint part 51 is formed.

FIG. 8(a) is a cross-sectional view taken along VIIIa-VIIIa in FIG. 7. As shown in FIG. 8(a), in the lead part 8b of the negative electrode current collector 8, the area where the irregularities formed part 8x is formed is irradiated with an energy ray L such as a laser. Thus, as shown in FIG. 8(b), an oxidized film 8y is formed on the surface of the irregularities formed part 8x of the lead part 8b. Note that when irradiation with an energy ray is performed, the surrounding atmosphere is assumed to contain oxygen. Here, the oxidized film 8y is composed of copper oxide (II).

FIG. 9(a) is an enlarged cross-sectional view of the irregularities formed part 8x before the oxidation treatment. FIG. 9(b) is an enlarged cross-sectional view of the irregularities formed part 8x after the oxidation treatment. As shown in FIG. 9(a), in lead part 8b at the time of ultrasonic joining, a burr 8z composed of copper or copper alloy may occur on the surface of the irregularities formed part 8x pressed by the anvil 91. As shown in FIG. 9(b), the oxidation treatment is performed on the surface of the irregularities formed part 8x, thus the oxidized film 8y is formed on the surface of the irregularities formed part 8x. Thus, the burr 8z composed of copper or copper alloy is oxidized, and the copper contained in the burr 8z is made divalent. Thus, even if the burr 8z detaches from the irregularities formed part 8x, and enters the electrode body 3 and moves onto the positive plate 4, divalent copper is not dissolved in the electrolyte at the time of charging. Therefore, the occurrence of dendrite composed of copper or copper alloy on the negative plate 5 can be reduced. Thus, it is possible to provide the secondary battery with reduced short circuit between the positive plate 4 and the negative plate 5.

Note that as shown in FIG. 10, it is preferable that oxidation treatment be performed on the irregularities formed part 8x and its periphery in the lead part 8b, and the oxidized film 8y be formed on the surface. Note that the oxidized film 8y has a sufficiently greater thickness than that of a normal oxidized film formed on the surface of copper or copper alloy. For example, the thickness of the oxidized film 8y formed by the oxidation treatment is preferably greater than or equal to twice the thickness of a naturally oxidized film present on the surface of a portion where the oxidation treatment has not been performed, more preferably greater than or equal to five times the thickness, and further preferably greater than or equal to 10 times the thickness. FIG. 8(b) is a cross-sectional view taken along VIIIb-VIIIb in FIG. 10.

Modification 1

FIGS. 11 to 16 each show a joint form between a negative electrode current collector and a negative electrode core body stacked part according to Modification 1. Modification 1 differs from the above-described embodiment in the shape of the lead part of the negative electrode current collector. In the negative electrode current collector 108 according to Modification 1, in a lead part 108b, a recessed portion 108d is provided in the surface on the opposite side of the surface facing the negative electrode core body stacked part 50. Thus, a thin wall part 108e is formed in the lead part 108b. The negative electrode current collector 108 has a rib 108c at one end of the lead part 108b in a widthwise direction.

As shown in FIG. 11, in the lead part 108b of the negative electrode current collector 108, the negative electrode core body stacked part 50 is disposed on the surface on the opposite side of the surface in which the recessed portion 108d is formed. The negative electrode core body stacked part 50 and the lead part 108b are clamped by the horn 90 and the anvil 91.

As shown in FIG. 12, the anvil 91 is brought into contact with the bottom face of the recessed portion 108d formed in the lead part 108b. Note that the anvil projections 91a of the anvil 91 are designed to bite into the bottom face of the recessed portion 108d.

As shown in FIG. 13, the lead part 108b and the negative electrode core body stacked part 50 are joined at the thin wall part 108e of the lead part 108b. The negative electrode core bodies 5a in the negative electrode core body stacked part 50 as well as the negative electrode core bodies 5a and the thin wall part 108e of the lead part 108b are joined, thereby forming the joint part 51. An irregularities formed part 108x, which is a mark pressed by the anvil 91 and formed in the lead part 108b, is formed on the bottom face of the recessed portion 108d.

FIG. 14 is a plan view of the surface of the lead part 108b on the opposite side of the surface joined to the negative electrode core body stacked part 50 after the negative electrode core body stacked part 50 and the lead part 108b are ultrasonically joined. The irregularities formed part 108x, which is a mark pressed by the anvil 91, is formed on the opposite side of a portion of the lead part 108b, the portion where the joint part 51 is formed. Note that FIG. 13 is a cross-sectional view taken along XIII-XIII in FIG. 14.

Next, the irregularities formed part 108x is irradiated with an energy ray such as a laser, and as shown in FIG. 15 and FIG. 16, an oxidized film 108y is formed on the surface of the irregularities formed part 108x of the lead part 108b. The oxidized film 108y is formed on the bottom face of the recessed portion 108d of the lead part 108b. Note that FIG. 16 is a cross-sectional view taken along XVI-XVI in FIG. 15.

Since a burr composed of copper or copper alloy formed in the irregularities formed part 108x, and a small metal piece composed of copper or copper alloy present on the surface of the irregularities formed part 108x are oxidized, the copper contained in the burr and the small metal piece is a divalent oxide. Thus, even if a detached oxidized burr and an oxidized small metal piece move onto the positive plate 4, the dissolution of the burr and small metal piece in the electrolyte can be reduced at the time of charging. Therefore, the occurrence of dendrite composed of copper or copper alloy on the negative plate 5 can be reduced. Thus, it is possible to provide the secondary battery with reduced short circuit between the positive plate 4 and the negative plate 5.

Note that when the irregularities formed part 108x is formed on the bottom face of the recessed portion 108d of the lead part 108b, the area where oxidation treatment is performed is easily identified, and the oxidation treatment can be stably performed.

Modification 2

In the above-described embodiment and Modification 1, an example has been shown, in which the irregularities formed part is irradiated with an energy ray. However, oxidation treatment may be performed on the surface of the irregularities formed part by another method. For example, the surfaces of the irregularities formed part 8x in the embodiment, and the irregularities formed part 108x in Modification 1 may be oxidized by bringing an oxidizing agent into contact with the surfaces of the irregularities formed part 8x and the irregularities formed part 108x. For example, an oxidizing agent can be applied or sprayed to the irregularities formed part 8x and the irregularities formed part 108x.

It is preferable that at least one selected from a group consisting of KBr, KCl, LiBr, LiCl, CuBr, $CuBr_2$, CuCl and $CuCl_2$ be used as the oxidizing agent. Note that the oxidizing agent is not particularly limited as long as it allows metal copper to be oxidized to a copper compound containing divalent copper.

Modification 3

In the above-described embodiment and Modification 1, an example has been shown, in which the irregularities formed part is irradiated with an energy ray. However, oxidation treatment may be performed on the surface of the irregularities formed part by another method. For example, the surfaces of the irregularities formed part 8x in the embodiment, and the irregularities formed part 108x in Modification 1 may be heated for a predetermined time under an atmosphere containing oxygen. For example, the surface of the irregularities formed part 108x may be heated for 5 to 200 minutes at 80 to 120° C. Note that in this process, in order to avoid an adverse effect on the separators included in the electrode body 3, it is preferable that the vicinity of the surface of the irregularities formed part 108x be locally heated.

[Ultrasonic Joining]

The conditions for ultrasonic joining a current collector and a core body stacked part are not particularly limited, however, ultrasonic joining may be performed by setting the horn load to 1000 N to 2500 N (100 kgf to 250 kgf), the frequency to 19 kHz to 30 kHz, and the joining time to 200 ms to 500 ms, for example. When the frequency is 20 kHz, the horn amplitude may be 50% to 90% of a maximum amplitude (for example, 50 μm). The oxidized films on the surfaces of the core bodies, and the surfaces of the current collectors which are included in the core body stacked part are removed due to friction by applying ultrasonic vibration to the core body stacked part, and the core bodies are solid-phase bonded as well as the core bodies and the current collectors are solid-phase bonded.

[Blow and Suction]

After the core body stacked part and the current collector are ultrasonically joined, it is preferable that small metal pieces adhering to the irregularities formed part be removed as much as possible by blowing or suctioning the irregularities formed part before the oxidation treatment is performed.

<Others>

In the above-described embodiment, a rectangular secondary battery having a flat-shaped wound electrode body has been exemplified as the secondary battery. However, a stack-type electrode body may be used, in which multiple positive plates and negative plates are alternately stacked with a separator interposed therebetween. Alternatively, a configuration may be adopted in which the positive electrode core body stacked part and the negative electrode core body stacked part are disposed at the end of the electrode body on the side of the sealing plate.

When the positive electrode core body is made of aluminum or aluminum alloy, the thickness of the positive electrode core body is preferably 5 to 30 μm, and more preferably 10 to 20 μm. In addition, the number of stacked layers of the positive electrode core body in the positive electrode core body stacked part is preferably 10 to 100 layers, and more preferably 30 to 100 layers.

When the negative electrode core body is made of copper or copper alloy, the thickness of the negative electrode core body is preferably 5 to 30 μm, and more preferably 6 to 15 μm. In addition, the number of stacked layers of the negative electrode core body in the negative electrode core body stacked part is preferably 10 to 100 layers, and more preferably 30 to 100 layers.

Publicly known materials can be used for the positive plate, the negative plate, the separator, the electrolyte and the like.

REFERENCE SIGNS LIST

100 RECTANGULAR SECONDARY BATTERY
200 BATTERY CASE
1 RECTANGULAR EXTERIOR BODY
2 SEALING PLATE
3 ELECTRODE BODY
4 POSITIVE PLATE
4a POSITIVE ELECTRODE CORE BODY
4b POSITIVE ELECTRODE ACTIVE MATERIAL LAYER
5 NEGATIVE PLATE
5a NEGATIVE ELECTRODE CORE BODY
5b NEGATIVE ELECTRODE ACTIVE MATERIAL LAYER
6 POSITIVE ELECTRODE CURRENT COLLECTOR
6a BASE PART
6b LEAD PART
6c RIB
6x IRREGULARITIES FORMED PART
7 POSITIVE ELECTRODE TERMINAL
7a FLANGE PART
8 NEGATIVE ELECTRODE CURRENT COLLECTOR
8a BASE PART
8b LEAD PART
8c RIB
8x IRREGULARITIES FORMED PART
8y OXIDIZED FILM
9 NEGATIVE ELECTRODE TERMINAL
9a FLANGE PART
10 INNER-SIDE INSULATING MEMBER
11 OUTER-SIDE INSULATING MEMBER
12 INNER-SIDE INSULATING MEMBER
13 OUTER-SIDE INSULATING MEMBER
14 INSULATING SHEET
15 GAS EXHAUST VALVE
16 ELECTROLYTE INJECTION HOLE
17 SEALING MEMBER
50 NEGATIVE ELECTRODE CORE BODY STACKED PART
51 JOINT PART
51x CORE BODY-SIDE IRREGULARITIES FORMED PART
90 HORN
90a HORN PROJECTION
91 ANVIL
91a ANVIL PROJECTION
108 NEGATIVE ELECTRODE CURRENT COLLECTOR
108b LEAD PART
108c RIB
108d RECESSED PORTION
108e THIN WALL PART
108x IRREGULARITIES FORMED PART
108y OXIDIZED FILM

The invention claimed is:

1. A method of manufacturing a secondary battery including:
   a first electrode plate,
   a second electrode plate having a polarity different from a polarity of the first electrode plate,
   an electrode body including the first electrode plate and the second electrode plate, and
   a first electrode current collector which is made of copper or copper alloy, and electrically connected to the first electrode plate,
   wherein the first electrode plate has a first electrode core body made of copper or copper alloy, and a first electrode active material layer formed on the first electrode core body,
   the electrode body has a first electrode core body stacked part in which the first electrode core body is stacked, and
   the first electrode core body stacked part is joined to the first electrode current collector,
   the method comprising:
   a joining step of clamping the first electrode core body stacked part and the first electrode current collector by a horn and an anvil, and in a state where the anvil is in contact with the first electrode current collector, ultrasonically joining the first electrode core body stacked part and the first electrode current collector to form a joint part; and an oxidation treatment step of oxidizing a portion, in contact with the anvil, of the first electrode current collector in the joining step.

2. The method of manufacturing a secondary battery according to claim 1, wherein in the oxidation treatment step, the portion, in contact with the anvil, of the first electrode current collector is irradiated with an energy ray.

3. The method of manufacturing a secondary battery according to claim 1, wherein in the oxidation treatment step, the portion, in contact with the anvil, of the first electrode current collector is brought into contact with an oxidizing agent.

4. The method of manufacturing a secondary battery according to claim 3, wherein the oxidizing agent is at least one selected from a group consisting of KBr, KCl, LiBr, LiCl, CuBr, $CuBr_2$, CuCl and $CuCl_2$.

5. The method of manufacturing a secondary battery according to claim 1, wherein in the oxidation treatment step, the portion, in contact with the anvil, of the first electrode current collector is heated under an atmosphere containing oxygen.

6. The method of manufacturing a secondary battery according to claim 1, further comprising a step of blowing or suctioning the portion, in contact with the anvil, of the first electrode current collector between the joining step and the oxidation treatment step.

7. A secondary battery comprising:

a first electrode plate;

a second electrode plate having a polarity different from a polarity of the first electrode plate;

an electrode body including the first electrode plate and the second electrode plate; and a first electrode current collector which is made of copper or copper alloy, and electrically connected to the first electrode plate, wherein the first electrode plate has a first electrode core body made of copper or copper alloy, and a first electrode active material layer formed on the first electrode core body, the electrode body has a first electrode core body stacked part in which the first electrode core body is stacked, and the first electrode core body stacked part is joined to the first electrode current collector, wherein an irregularities formed part is formed on a surface of the first electrode current collector on an opposite side of a surface joined to the first electrode core body stacked part, a layer composed of a copper compound containing divalent copper is formed on a surface of the irregularities formed part, and a thickness of the layer composed of the copper compound containing divalent copper is greater than a thickness of an oxidized film formed on a surface of a portion of the first electrode current collector, the portion being at a position away from the irregularities formed part.

8. The secondary battery according to claim 7, wherein the thickness of the layer composed of the copper compound containing divalent copper is greater than or equal to twice the thickness of the oxidized film formed on the surface of the portion of the first electrode current collector, at the position away from the irregularities formed part.

* * * * *